(12) United States Patent
Kim et al.

(10) Patent No.: US 12,354,239 B2
(45) Date of Patent: Jul. 8, 2025

(54) ELECTRONIC APPARATUS FOR PROCESSING AN IMAGE AND CONTROL METHOD THEREOF

(71) Applicant: SAMSUNG ELECTRONICS CO., LTD., Suwon-si (KR)

(72) Inventors: Myungjae Kim, Suwon-si (KR); Yoojin Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 513 days.

(21) Appl. No.: 17/892,727

(22) Filed: Aug. 22, 2022

(65) Prior Publication Data
US 2023/0125014 A1    Apr. 20, 2023

Related U.S. Application Data

(63) Continuation of application No. PCT/KR2022/009650, filed on Jul. 5, 2022.

(30) Foreign Application Priority Data

Oct. 18, 2021    (KR) .................. 10-2021-0138138

(51) Int. Cl.
  G06T 5/50      (2006.01)
  G06T 3/4046    (2024.01)
  (Continued)

(52) U.S. Cl.
  CPC .............. *G06T 5/50* (2013.01); *G06T 3/4046* (2013.01); *G06T 5/40* (2013.01); *G06T 5/73* (2024.01);
  (Continued)

(58) Field of Classification Search
  CPC .......... G06T 5/50; G06T 3/4046; G06T 5/40; G06T 5/73; G06T 7/90;
  (Continued)

(56) References Cited

U.S. PATENT DOCUMENTS 9,225,905 B2    12/2015    Yoon et al.
10,198,839 B2    2/2019    Rymkowski et al.
(Continued)

FOREIGN PATENT DOCUMENTS

CN    111738910 A    10/2020
KR    10-1191317 B1    10/2012
(Continued)

OTHER PUBLICATIONS

English machine translation of CN111311513A, published on Jun. 19, 2020. (Year: 2020).*

(Continued)

*Primary Examiner* — Phuoc Tran
(74) *Attorney, Agent, or Firm* — Sughrue Mion, PLLC

(57) ABSTRACT

An electronic apparatus for image processing is disclosed. The electronic apparatus includes a memory configured to store a first neural network model trained to transfer a style of an image; and a processor configured to: perform at least one image processing operation on a first image, based on at least one quality of the first image, to obtain an image-processed first image; obtain a second image having a style transferred thereto by inputting the image-processed first image to the first neural network model; based on a color difference between the first image and the second image being greater than or equal to a first threshold value perform a weighted-summation of a brightness value of the first image and a brightness value of the second image to obtain a weighted-summed brightness value, and change the brightness value of the first image to the weighted-summed brightness value; and based on the color difference between the first image and the second image being less than the first threshold value, output the second image.

20 Claims, 9 Drawing Sheets

(51) Int. Cl.
  *G06T 5/40* (2006.01)
  *G06T 5/73* (2024.01)
  *G06T 7/90* (2017.01)
  *G06V 20/60* (2022.01)

(52) U.S. Cl.
  CPC ............... *G06T 7/90* (2017.01); *G06V 20/60* (2022.01); *G06T 2207/10024* (2013.01); *G06T 2207/20081* (2013.01); *G06T 2207/20084* (2013.01); *G06T 2207/30168* (2013.01)

(58) Field of Classification Search
  CPC . G06T 2207/10024; G06T 2207/20081; G06T 2207/20084; G06T 3/40; G06T 5/60; G06T 11/001; G06T 2207/30201; G06V 20/60; G06V 10/82
  See application file for complete search history.

(56) References Cited

U.S. PATENT DOCUMENTS

| | | | |
|---|---|---|---|
| 11,043,013 | B2 | 6/2021 | Jung et al. |
| 11,355,089 | B2 | 6/2022 | Jang et al. |
| 11,816,145 | B2 | 11/2023 | Chang et al. |
| 2019/0014884 | A1* | 1/2019 | Fu .................. G06T 1/0007 |
| 2021/0241498 | A1 | 8/2021 | Sun et al. |
| 2021/0258449 | A1 | 8/2021 | Kanamori |
| 2021/0287047 | A1 | 9/2021 | Gao et al. |
| 2022/0092106 | A1 | 3/2022 | Chang et al. |

FOREIGN PATENT DOCUMENTS

| | | |
|---|---|---|
| KR | 10-2014-0018686 A | 2/2014 |
| KR | 10-2020-0036661 A | 4/2020 |
| KR | 10-2021-0011162 A | 2/2021 |
| KR | 10-2211762 B1 | 2/2021 |
| KR | 10-2021-0095936 A | 8/2021 |
| KR | 10-2021-0100267 A | 8/2021 |
| KR | 10-2021-0101571 A | 8/2021 |
| KR | 10-2021-0102413 A | 8/2021 |
| KR | 10-2021-0109244 A | 9/2021 |

OTHER PUBLICATIONS

Gatys, et al., "A Neural Algorithm of Artistic Style", Aug. 2015, arXiv:1508.06576v1 [cs.CV], 16 pages total.

International Search Report (PCT/ISA/210) issued Oct. 21, 2022 by the International Searching Authority in International Application No. PCT/KR2022/009650.

Written Opinion (PCT/ISA/27) issued Oct. 21, 2022 by the International Searching Authority in International Application No. PCT/KR2022/009650.

Kumar, M. P. Pavan, B. Poornima, H. S. Nagendraswamy and C. Manjunath. "Structure-preserving NPR framework for image abstraction and stylization." The Journal of Supercomputing, Jan. 21, 2021, 77, pp. 8445-8513, DOI:10.1007/s11227-020-03547-w.

Communication issued on Aug. 26, 2024 by the European Patent Office in European Patent Application No. 22883714.2.

* cited by examiner

ELECTRONIC APPARATUS FOR PROCESSING AN IMAGE AND CONTROL METHOD THEREOF

CROSS-REFERENCE TO RELATED APPLICATION(S)

This application is a bypass continuation of International Application No. PCT/KR2022/009650, filed on Jul. 5, 2022, which is based on and claims priority to Korean Patent Application No. 10-2021-0138138, filed on Oct. 18, 2021, in the Korean Intellectual Property Office, the disclosures of which are incorporated by reference herein in their entireties.

BACKGROUND

1. Field

The disclosure relates to an electronic apparatus and a control method thereof, and more particularly, to an electronic apparatus for processing an image and a control method thereof.

2. Description of Related Art

With the development of electronic technology, services of various types are being developed. In particular, recently, various methods providing multimedia (e.g., image, video, etc.) services such as a style transfer of an image are being provided. Briefly, a style transfer transforms an existing image, such as a photograph, to mimic visual aspects of another image or set of images, such as the style of a particular artist or art movement.

A style transfer technique uses various optimizing methods and pixel/feature-based regularization techniques to control a pixel value from being modified excessively compared to an original image, or to maintain smoothness, among other controls. In addition, a user may select an undesired artifact area from a style-transferred image, and substitute the artifact area with a source image by selecting a ratio of the source image.

However, according to a method of the related art, transferring a style while maintaining a quality of a resulting image is difficult. For example, in the case of texture representation, there is the problem of borderlines of an object disappearing, or lines being represented excessively. Alternatively, in the case of color representation, there is the problem of colors shifting to a completely different color from an original color, or color being represented non-uniformly like a stain.

For example, if a photograph is not captured clearly due to a camera shaking during capture, or due to capturing a moving subject, a style transfer effect may be reduced due to image sharpness being low. Additionally, when a subject is captured in small scale, a line representation may disappear or be represented as if distorted, and a modified result different from an original may be obtained. Furthermore, if image contrast is low or dark due to an effect of ambient illuminance, the line representation may be lost when performing style transfer due to detail information of the dark portions being lost.

Even in terms of color, although a color loss function can be trained so as to maintain a color of an original copy or to prevent color shifting from occurring, or a refinement process such as deleting or adding learning data is performed, it is difficult to guarantee an improved result, and so there is the problem of requiring significant time because of empirical improvements through a repeated learning process.

Accordingly, when generating a new image with methods such as style transfer, there is a need for a method to be developed for generating an optimized result without degradation of quality in the generated image even if there is no user interference.

SUMMARY

Provided are an electronic apparatus which provides an optimized image processing result during style transfer or other image manipulation without user interference and a control method thereof.

According to an aspect of the disclosure, an electronic apparatus includes: a memory configured to store a first neural network model trained to transfer a style of an image; and a processor configured to: perform at least one image processing operation on a first image, based on at least one quality of the first image, to obtain an image-processed first image; obtain a second image having a style transferred thereto by inputting the image-processed first image to the first neural network model; based on a color difference between the first image and the second image being greater than or equal to a first threshold value perform a weighted-summation of a brightness value of the first image and a brightness value of the second image to obtain a weighted-summed brightness value, and change the brightness value of the first image to the weighted-summed brightness value; and based on the color difference between the first image and the second image being less than the first threshold value, output the second image.

The processor may be further configured to: identify a value of at least one quality of the first image from among a sharpness of the first image, a contrast of the first image, or a size of an object included in the first image; and perform the image processing operation on the first image based on the identified value.

The memory may be further configured to store a second neural network model trained to enhance a sharpness of an image, and the processor may be further configured to: identify a value of the sharpness of the first image based on a frequency component of the first image; and input the first image to the second neural network model, based on the value of the sharpness of the first image being less than a threshold sharpness value, to obtain a sharpness-enhanced first image.

The memory may be further configured to further store a second neural network model trained to enhance a sharpness of an image, and the processor may be further configured to: identify a representation of an object within the first image; identify a value of a first sharpness of a first area based on a frequency component of the first area, the first area defined to be an area of the first image of a pre-set size which includes the representation of the object; and input the first image to the second neural network model, based on the value of the first sharpness being less than the threshold sharpness value, to thereby obtain a sharpness-enhanced first image.

The processor may be further configured to: identify a value of a second sharpness of a second area based on a frequency component of the second area which is a remaining area of the first image excluding the first area; and input the first area to the second neural network model, based on the value of the first sharpness being greater than the value of the second sharpness by at least a second threshold sharpness value and the value of the first sharpness being less than the threshold sharpness value, to obtain a sharpness-enhanced first area.

The memory may be further configured to store a third neural network model trained to enhance a contrast of an image, and the processor may be further configured to obtain, based on a value of the contrast of the first image being less than a threshold contrast value, a contrast-enhanced first image by inputting the first image to the third neural network model or by using a histogram equalization method.

The processor may be further configured to: up-scale an area of a pre-set size which includes the object, based on the size of the object included in the first image being less than a threshold size, to obtain an up-scaled area, input the up-scaled area to the first neural network model to obtain a style-transferred up-scaled area, and down-scale the style-transferred up-scaled area to obtain a down-scaled area.

The processor may be further configured to update the second image based on the down-scaled area.

The memory may be further configured to store a fourth neural network model trained to up-scale an image, and the processor may be further configured to up-scale the area by inputting the area to the fourth neural network model, or by interpolating the area.

The processor may be further configured to: identify, based on a plurality of objects being identified in the first image, one object from among the plurality of objects based on a type of the plurality of objects; and up-scale, based on a size of the identified object being less than the threshold size, the area of the pre-set size which includes the identified object.

The processor may be further configured to: convert the first image and the second image to YUV color coordinates; and identify the color difference between the first image and the second image by comparing the first image converted to the YUV color coordinates and the second image converted to the YUV color coordinates.

According to an aspect of the disclosure, a control method of an electronic apparatus includes: processing a first image based on a quality of the first image to obtain an image-processed first image; obtaining a second image having a style transferred thereto by inputting the image-processed first image to a first neural network model trained to transfer a style of an image; based on a color difference between the first image and the second image being greater than or equal to a first threshold value; performing a weighted-summation of a brightness value of the first image and a brightness value of the second image to obtain a weighted-summed brightness value, and changing the brightness value of the first image to the weighted-summed brightness value; and based on the color difference between the first image and the second image being less than the first threshold value, outputting the second image.

The processing the image may include identifying a value of at least one quality of the first image from among a sharpness of the first image, a contrast of the first image, or a size of an object included in the first image, and processing the first image based on the identified value.

The processing the image may further include: identifying a value of the sharpness of the first image based on a frequency component of the first image; and obtaining, based on the value of the sharpness of the first image being less than a threshold sharpness value, a sharpness-enhanced first image by inputting the first image to a second neural network model trained to enhance a sharpness of an image.

The processing the image may further include: identifying a representation of an object in the first image; identifying a value of a first sharpness of a first area based on a frequency component of the first area, the first area being an area of the first image of a pre-set size which includes the object; and obtaining, based on the value of the first sharpness being less than the threshold sharpness value, a sharpness-enhanced first image by inputting the first image to a second neural network model trained to enhance a sharpness of an image.

According to various embodiments of the disclosure such as described above, the electronic apparatus may provide an enhanced style transfer result product according to having pre-processed the image based on elements which may be problematic in the style transfer process.

In addition, the electronic apparatus may provide a result product in which a degree of color change is maintained to less than or equal to a certain level even if the style is transferred according to mixing the original image and the style transfer result product.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Embodiments of the disclosure will be described in detail below with reference to the accompanying drawings. The embodiments of the disclosure may be diversely modified. Accordingly, it is to be understood that the present disclosure is not limited to a specific embodiment, but includes all modifications, equivalents, and substitutions without departing from the scope and spirit of the present disclosure. Also, well-known functions or constructions are not described in detail since they would obscure the disclosure with unnecessary detail.

Terms used in describing the embodiments of the disclosure are general terms selected that are currently widely used considering their function herein. However, the terms may change depending on intention, legal or technical interpretation, emergence of new technologies, and the like of those skilled in the related art. In addition, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

While this disclosure primarily discusses embodiments of the invention in the context of image style transfer, this is meant as an illustrative example, and improvement of other forms of image manipulation using the systems and techniques disclosed herein is within the scope of the invention In the disclosure, expressions such as "comprise," "may comprise," "include," "may include," or the like are used to designate a presence of a corresponding characteristic (e.g., elements such as numerical value, function, operation, or component, etc.), and not to preclude a presence or a possibility of additional characteristics.

The expression at least one of A and/or B is to be understood as indicating at least one of "A" or "B" or "A and B."

The expressions such as "first," "second," "1st," or "2nd" used herein may be used to refer to various elements, regardless of order and/or importance, and it should be noted that the expressions are merely used to distinguish an element from another element and not to limit the relevant elements.

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

In this disclosure, the term "user" may refer to a person using an electronic apparatus or a device (e.g., artificial intelligence electronic device) using an electronic apparatus.

Figure 1:
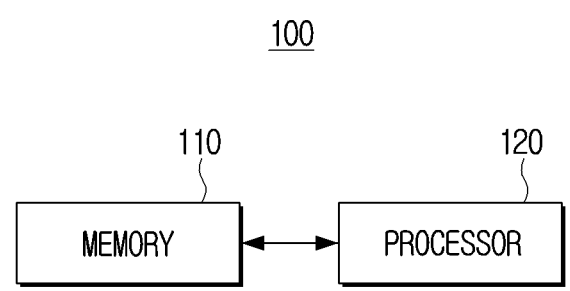
FIG. 1 is a block diagram illustrating a configuration of an electronic apparatus according to an embodiment.

FIG. 1 is a block diagram illustrating a configuration of an electronic apparatus 100 according to an embodiment. The electronic apparatus 100 may include, as illustrated in FIG. 1, a memory 110 and a processor 120.

The electronic apparatus 100 may be an apparatus for processing an image, and may be a set top box (STB), a desktop personal computer (PC), a notebook, a smartphone, a tablet PC, a server, a television (TV), or the like. However, the embodiment is not limited thereto, and the electronic apparatus 100 may be any apparatus as long as it is an apparatus capable of processing an image.

The memory 110 may refer to a hardware configured to store information such as data in an electric or magnetic form accessible by the processor 120 and the like. To this end, the memory 110 may be implemented as at least one hardware from among a non-volatile memory, a volatile memory, a flash memory, a hard disk drive (HDD) or a solid state drive (SSD), a random access memory (RAM), a read only memory (ROM), and the like.

In the memory 110, at least one instruction or module necessary in an operation of the electronic apparatus 100 or the processor 120 may be stored. Here, the instruction may be a code unit instructing an operation of the electronic apparatus 100 or the processor 120, and may be prepared in a machine language which is a language understood by a computer. The module may be a series of instruction sets performing a specific task of a task unit.

In the memory 110, data which is information in a bit or a byte unit capable of representing a character, a number, an image, or the like, may be stored. For example, an image may be stored in the memory 110.

In the memory 110, an image quality measuring module, a pre-processing module, a style transfer module, a post-processing module, and the like may be stored.

In the memory 110, various neural network models may be stored. For example, a first neural network model trained to transfer a style of an image, a second neural network model trained to enhance a sharpness of an image, a third neural network model trained to enhance a contrast of an image, a fourth neural network model trained to up-scale an image, and the like, may be stored in the memory 110.

The memory 110 may be accessed by the processor 120, and reading/writing/modifying/deleting/updating of an instruction, a module or data may be performed by the processor 120.

The processor 120 may be configured to control the overall operation of the electronic apparatus 100. Specifically, the processor 120 may be configured to control the overall operation of the electronic apparatus 100 by being connected with each configuration of the electronic apparatus 100. For example, the processor 120 may be configured to control an operation of the electronic apparatus 100 by being connected with configurations such as the memory 110, a display (not shown), and a camera (not shown).

According to an embodiment, the processor 120 may be implemented as a digital signal processor (DSP), a microprocessor, and a time controller (TCON). However, the embodiment is not limited thereto, and may include one or more from among a central processing unit (CPU), a micro controller unit (MCU), a micro processing unit (MPU), a controller, an application processor (AP), a communication processor (CP), an ARM processor, or the like, or may be defined by the corresponding term. In addition, the processor 120 may be implemented as a System on Chip (SoC) or a large scale integration (LSI) in which a processing algorithm is embedded, and may be implemented in the form of a field programmable gate array (FPGA).

The processor 120 may be configured to process a first image based on a quality of the first image. For example, the processor 120 may be configured to enhance the sharpness of the first image, enhance a contrast of the first image, or up-scale a part of an area of the first image. Here, the first image may represent an original image. Alternatively, the first image may represent an individual frame of an original moving image.

However, the embodiment is not limited thereto, and the processor 120 may be configured to image-process at least one image quality from among the sharpness, the contrast, or a size of the first image.

The processor 120 may be configured to obtain a second image which is transferred in style by inputting the image-processed first image to the first neural network model trained to transfer the style of the image stored in the memory 110.

For example, the processor 120 may be configured to transfer the first image to a cartoon style. However, the embodiment is not limited thereto, and the processor 120 may perform various style transfers.

The processor 120 may be configured to perform, based on a color difference between the first image and the second image being greater than or equal to a first threshold value, weighted-summation of a brightness value of the first image and a brightness value of the second image, and change the brightness value of the first image to a weighted-summed brightness value.

For example, the processor 120 may be configured to convert the first image and the second image to YUV color coordinates, and identify the color difference between the first image and the second image by comparing the first image converted to the YUV color coordinates and the second image converted to the YUV color coordinates. The processor 120 may be configured to perform, based on the color difference between the first image and the second image being greater than or equal to the first threshold value, the weighted-summation of a Y value of the first image and a Y value of the second image, and obtain an image including U and V values and the weighted-summed Y value of the first image. Here, the processor 120 may be configured to determine a degree of weighted-summation based on the color difference.

That is, the processor 120 may be configured to output the first image with the Y value as a weighted-summed Y value based on the color difference between the first image and the second image being greater than or equal to the first threshold value, and output the second image based on the color difference between the first image and the second image being less than the first threshold value.

The processor 120 may be configured to identify a value of at least one quality of the image from among the sharpness of the first image, the contrast of the first image, or a size of an object included in the first image (that is, a size of a representation of the object as depicted within the first image), and to process the first image based on the quality and value thereof.

(It is here noted that, for reasons of brevity, this disclosure will in places describe an object which has a representation within an image as being "contained within" or "included in" an image.)

For example, the processor 120 may be configured to identify a value of the sharpness of the first image based on a frequency component of the first image, and obtain a sharpness-enhanced first image by inputting the first image to the second neural network model trained to enhance the sharpness of the image, based on the sharpness of the first image being less than a threshold sharpness. The processor 120 may be configured such that a line representation is clearly maintained even if the style is transferred because the sharpness-enhanced first image is input to the first neural network model.

The processor 120 may be configured to identify an object from the first image, identify a first sharpness of a first area based on the frequency component of the first area, where the first area is defined to be of a pre-set size and to include the object, and obtain the sharpness-enhanced first image by inputting the first image to the second neural network model, based on the first sharpness being less than the threshold sharpness.

For example, the processor 120 may be configured to identify a face of a person represented in the first image, identify the first sharpness of the first area based on the frequency component of the first area, and obtain the sharpness-enhanced first image by inputting the first image to the second neural network model, based on the first sharpness being less than the threshold sharpness. That is, the processor 120 may be configured to determine whether to enhance sharpness based on only the face of the person and/or other key areas. Because whether to enhance sharpness is determined with only a part of the area and not a whole area, an image processing speed may be enhanced. Thus, the processor 120 may be configured such that the line representation is maintained clearly even if the style is transferred because the sharpness-enhanced first image is input to the first neural network model.

In addition, the processor 120 may be configured to identify a second sharpness of a second area, which is defined to be a remaining area of the first image excluding the first area, based on the frequency component of the second area and obtain a sharpness-enhanced first area by inputting the first area to the second neural network model, based on the first sharpness being greater than the second sharpness by a second threshold value or more and the first sharpness being less than the threshold sharpness. For example, the first image may be an out-focused photograph about a face of a person. In this case, the face of the person is required to maintain sharpness even after the style transfer, but a background area is not required to maintain sharpness. Accordingly, the processor 120 may be configured to identify, based on the first sharpness of the area which includes the face of the person being greater than the second sharpness of the background area by the second threshold value or more, the first image as an out-focused image. Then, the processor 120 may be configured to identify, based on the first sharpness being less than the threshold sharpness, a facial part of the out-focused image as unclear. In this case, because the background area does not need sharpness to be enhanced, the processor 120 may be configured to enhance only the sharpness of the area including the face of the person by inputting only the area including the face of the person to the second neural network model. Then, the processor 120 may be configured, because the sharpness enhanced first image of the area including the face of the person is input to the first neural network model, to maintain the line representation of the area including the face of the person clearly even if the style is transferred.

The processor 120 may be configured to obtain, based on the contrast of the first image being less than a threshold contrast, a contrast-enhanced first image by inputting the first image to the third neural network model trained to enhance the contrast of the image, or alternatively to obtain the contrast-enhanced first image through a histogram equalization method. Then, the processor 120 may be configured, because the contrast-enhanced first image is input to the first neural network model, to maintain the line representation clearly even if the style is transferred.

The processor 120 may be configured to up-scale an area of a pre-set size including an object, based on the size of the object included in the first image being less than a threshold size, obtain an up-scaled area which is style-transferred by inputting the up-scaled area to the first neural network model, and down-scale the style-transferred up-scaled area. Then, the processor 120 may be configured to update the second image based on a down-scaled area.

For example, the processor 120 may be configured to identify the face of the person from the first image, up-scale the area including the face of the person, obtain the style-transferred up-scaled area by inputting the up-scaled area to the first neural network model, and down-scale the style-transferred up-scaled area. In this case, the line representation may be clearer because the area including the face of the person is style-transferred in an up-scaled state. Then, the processor 120 may be configured to obtain a style-transferred second image by inputting the first image to the first neural network model. Here, the first image itself may be in a state which is not image processed. The processor 120 may transfer the area including the face of the person in the second image to the down-scaled area, and accordingly, the line representation of the area including the face of the person may be clearer.

The processor 120 may be configured to obtain the up-scaled area by inputting the area of the pre-set size to the fourth neural network model trained to up-scale an image, or alternatively to obtain the up-scaled area by interpolating the area of the pre-set size.

The processor 120 may be configured to identify, based on a plurality of objects being identified from the first image, one object from among the plurality of objects based on a type of the plurality of objects, and up-scale, based on a size of an identified object being less than the threshold size, the area of the pre-set size including the identified object.

For example, the processor 120 may be configured to determine, based on the face of the person and an automobile being identified from the first image, whether to perform up-scaling of the area including the face of the person based on the size of the area including the face of the person. However, the embodiment is not limited thereto, and the processor 120 may be configured to up-scale the area including the plurality of objects of less than the threshold size from the first image. Here, the size of the respective objects may be identified by a number of pixels occupied by the respective objects.

A function associated with an artificial intelligence according to the disclosure may be operated through the processor 120 and the memory 110.

The processor 120 may be configured as one or a plurality of processors. Each of the one or plurality of processors, or the processor 120 as a whole, may be a generic-purpose processor such as a CPU, an AP, or a digital signal processor (DSP), a graphics dedicated processor such as a graphics processing unit (GPU) or a vision processing unit (VPU), or an artificial intelligence dedicated processor such as a neural processing unit (NPU).

The one or plurality of processors may control for the input data to be processed according to a pre-defined operation rule or an artificial intelligence model stored in the memory. Alternatively, if the one or plurality of processors is or includes an artificial intelligence dedicated processor, the artificial intelligence dedicated processor may be designed to a hardware structure specializing in the processing of a specific artificial intelligence model. The pre-defined operation rule or the artificial intelligence model is characterized by being created through learning.

For the purposes of this disclosure, "being created through learning" may mean that the pre-defined operation rule or the artificial intelligence model is created to perform a desired feature (or purpose). This creation may occur by training a basic artificial intelligence model, by a learning algorithm, using one or more sets of learning data. The learning may be carried out from a device within which the artificial intelligence operates according to the disclosure, or carried out through a separate server and/or a system. Examples of the learning algorithm may include supervised learning, unsupervised learning, semi-supervised learning, or reinforcement learning, but is not limited to the above-described examples.

The artificial intelligence model may be configured with a plurality of neural network layers. The respective neural network layers may include a plurality of weight values, and may perform neural network processing through processing between the processing results of a previous layer and the plurality of weight values. The plurality of weight values comprised by the plurality of neural network layers may be optimized by the learning result of the artificial intelligence model. For example, the plurality of weight values may be updated for a loss value or a cost value obtained by the artificial intelligence model during the learning process to be reduced or minimized.

An artificial neural network may include a Deep Neural Network (DNN), and examples thereof may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, or the like, but is not limited to the above-described examples.

Figure 2:
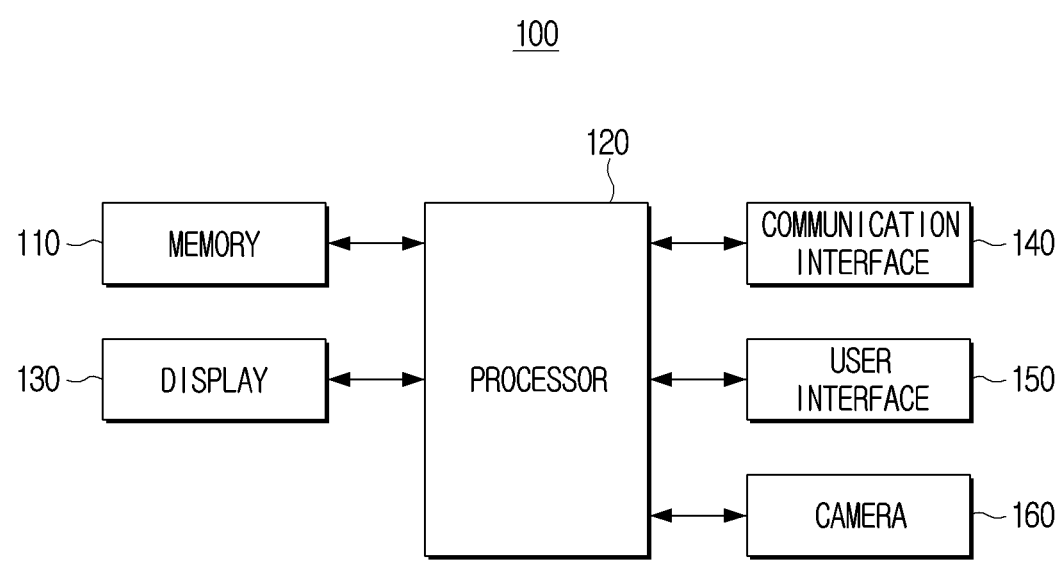
FIG. 2 is a block diagram illustrating a detailed configuration of an electronic apparatus according to an embodiment.

FIG. 2 is a block diagram illustrating a detailed configuration of the electronic apparatus 100 according to an embodiment. The electronic apparatus 100 may include the memory 110 and the processor 120. In addition, referring to FIG. 2, the electronic apparatus 100 may further include a display 130, a communication interface 140, a user interface 150, and a camera 160. The detailed description of parts overlapping with elements illustrated in FIG. 1 from among the elements illustrated in FIG. 2 will be omitted.

The display 130 may be implemented as a display of various forms such as, for example, and without limitation, a liquid crystal display (LCD), an organic light emitting diode (OLED) display, a plasma display panel (PDP), and the like. In the display 130, a driving circuit, which may be implemented in the form of an a-si thin film transistor (TFT), a low temperature poly silicon (LTPS) TFT, an organic TFT (OTFT), or the like, a backlight unit, and the like may be included. The display 130 may be implemented as a touch screen coupled with a touch sensor, a flexible display, a three-dimensional display (3D display), or the like.

The communication interface 140 may be a configuration which performs communication with external devices of various types according to communication methods of various types. For example, the electronic apparatus 100 may perform communication with the server through the communication interface 140.

The communication interface 140 may include a WiFi module, a Bluetooth module, an infrared communication module, a wireless communication module, and the like. Here, the respective communication modules may be implemented to at least one hardware chip form.

The WiFi module and the Bluetooth module may perform communication in the WiFi method and the Bluetooth method, respectively. When using the WiFi module or the Bluetooth module, various connection information such as a service set identifier (SSID) and a session key may first be transmitted and received, and may transmit and receive various information after communicatively connecting using the same. The infrared communication module may perform communication according to an infrared communication (Infrared Data Association (IrDA)) technology of transmitting data wirelessly in short range by using infrared rays present between visible rays and millimeter waves.

The wireless communication module may include at least one communication chip configured to perform communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like in addition to the above-described communication method.

Alternatively, the communication interface 140 may include a wired communication interface such as, for example, and without limitation, a High Definition Multi-media Interface (HDMI), a display port (DP), a Thunderbolt, a Universal Serial Bus (USB), a RGB, a D-SUB, a Digital Visual Interface (DVI), and the like.

Other communication interfaces 140 may include at least one from among the wired communication modules performing communication by using a Local Area Network (LAN) module, an Ethernet module, a pair cable, a coaxial cable, an optical fiber cable, or the like.

The user interface 150 may be implemented as a button, a touch pad, a mouse, a keyboard, and the like, or implemented as a touch screen capable of performing a display function and an operation input function together therewith. Here, the button may be a mechanical button formed at a random area of a front surface, a side surface, a rear surface, or the like of an outer exterior of a main body of the electronic apparatus 100, or a button of various types such as the touch pad and a wheel.

The camera 160 may be configured for capturing a still image or a moving image according to a control of the user. The camera 160 may be configured to capture the still image at a specific time point, but may also capture a consecutive series of still images.

The camera 160 may include a lens, a shutter, an aperture, an Analog Front End (AFE), and a Timing Generator (TG). The shutter may be configured to adjust a time during which light reflected from a subject enters the camera 160, and the aperture may be configured to adjust an amount of light incident to the lens by mechanically increasing or decreasing a size of an opening through which light enters. The solid-state imaging device may be configured to output, based on light reflected from the subject being accumulated as photo charge, an image by the photo charge as an electric signal. The TG may be configured to output a timing signal for reading out pixel data of the solid-state imaging device, and the AFE may be configured to digitalize the electric signal output from the solid-state imaging device by sampling.

As described above, the processor 120 may be configured to transfer the style after pre-processing the image, and a style processing result may be enhanced according to post-processing the style-transferred image. However, the embodiment is not limited thereto, and the processor 120 may also, or alternatively, be configured to perform another image processing which is not the style transfer, which may be any method capable of performing pre-processing and/or post-processing as in the disclosure.

An operation of the electronic apparatus 100 may be described in greater detail below through FIGS. 3 to 8. In FIGS. 3 to 8, separate embodiments are described for convenience of description. However, the separate embodiments of FIGS. 3 to 8 may be implemented to any combined state.

Figure 3:
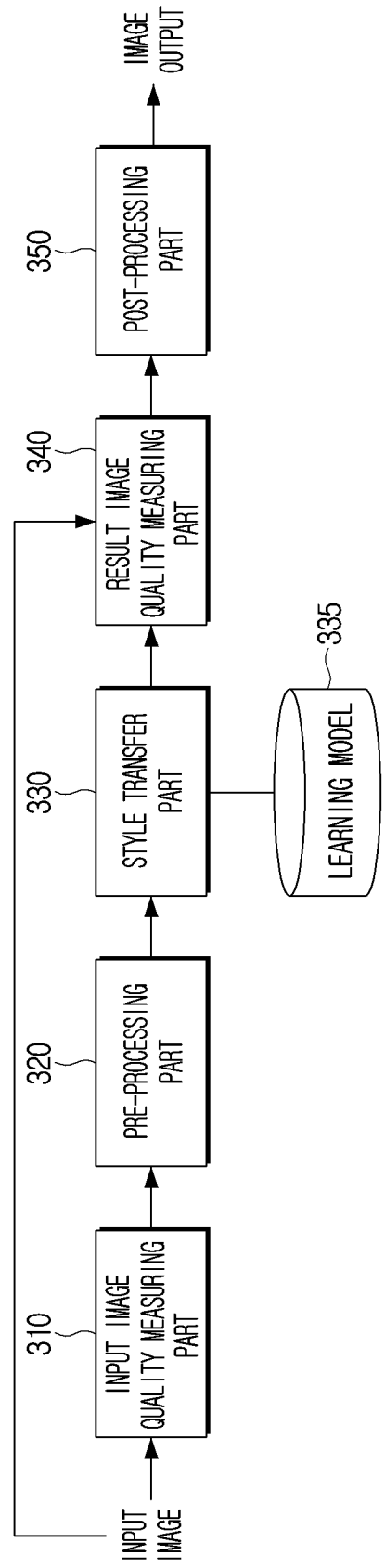
FIG. 3 is a diagram illustrating an image processing method according to an embodiment.

FIG. 3 is a functional diagram illustrating an image processing method as performed by various components according to an embodiment.

An input image quality measuring part 310, a pre-processing part 320, a style transfer part 330, a result image quality measuring part 340, and a post-processing part 350 as illustrated in FIG. 3 may each be respectively implemented as a hardware module, or may be collectively implemented such that some or all share a hardware module. For example, the processor 120 may include one or more hardware modules which perform operations of one or more of the input image quality measuring part 310, the pre-processing part 320, the style transfer part 330, the result image quality measuring part 340, and the post-processing part 350, respectively. However, the embodiment is not limited thereto, and the one or more hardware modules which perform the operations of one or more of the input image quality measuring part 310, the pre-processing part 320, the style transfer part 330, the result image quality measuring part 340, and the post-processing part 350, respectively, may be implemented outside of the processor 120. Alternatively, one or more of the input image quality measuring part 310, the pre-processing part 320, the style transfer part 330, the result image quality measuring part 340, and the post-processing part 350 may be implemented as a software, respectively.

The input image quality measuring part 310 may identify a value of at least one image quality from among a sharpness of an input image, a contrast of the input image, or a size of an object included in the input image. For example, the input image quality measuring part 310 may apply a Fast Fourier Transform (FFT) to the input image, and measure the sharpness (e.g., degree of blurring) from a distribution degree of a high-frequency component and a low-frequency component from a frequency domain. Alternatively, or in addition, the input image quality measuring part 310 may measure the contrast of the input image by using a Contrast Noise Ratio (CNR). Alternatively, or in addition, the input image quality measuring part 310 may identify a face of a person from the input image, and identify the size of the object by measuring the size of the identified face. At this time, the input image quality measuring part 310 may measure a size of a facial area by labeling the face and the area other than the face through a semantic segmentation.

The pre-processing part 320 may include at least one from among a deblur processing part, a scaling part, or a high dynamic range (HDR) part. For example, the pre-processing part 320 may include the deblur processing part, and may perform the deblur processing of the input image based on the sharpness of the input image measured from the input image quality measuring part 310 being less than the threshold sharpness. Here, the deblur processing part may be implemented with a deep learning-based deblur learning model.

Alternatively, or in addition, the pre-processing part 320 may include the scaling part, and up-scale the area of the pre-set size which includes the object, based on the size of the object measured from the input image quality measuring part 310 being less than the threshold size. For example, the scaling part may perform up-scaling with an interpolation method such as a bilinear method. Alternatively, the scaling part may be implemented with a deep learning based super resolution learning model. Here, the area of the pre-set size may be a smallest quadrangle type area which includes the object.

Alternatively, or in addition, the pre-processing part 320 may include the HDR part, and may increase the contrast of the input image based on the contrast of the input image measured from the input image quality measuring part 310 being less than the threshold contrast. For example, the HDR part may enhance the contrast through the histogram equalization method. Alternatively, the HDR part may be implemented with a deep learning based HDR learning model.

The pre-processing part 320 may include all of the deblur processing part, the scaling part, and the HDR part, and may perform a plurality of image processing operations on the input image based on at least two from among the sharpness of the input image, the contrast of the input image, or the size of the object included in the input image falling below a standard.

The style transfer part 330 may be implemented to apply one from among learning models 335 such as, for example, and without limitation, a neural style transfer, a cycle generative adversarial networks (GAN), a cartoon GAN, and the like to a pre-processed image. For example, the cartoon GAN may be configured of a generator network training to transfer an actual photograph to a cartoon style and a discriminator network training to differentiate the actual photograph and the cartoon. Then, after learning is complete, a result image of having been transferred to a cartoon style from the input image is generated by using only the generator network.

The result image quality measuring part 340 may identify the color difference of the input image and the result image. For example, the result image quality measuring part 340 may convert the input image and the result image to the YUV color coordinates, and identify the color difference of the input image and the result image by comparing the input image converted to the YUV color coordinates and the result image converted to the YUV color coordinates. For example, assuming that Y, U, V are respectively coordinate values of a 3-dimensional space, the result image quality measuring part 340 may obtain a Euclidean distance of the Y, U, V of the input image and the Y, U, V of the output image with the color difference of the input image and the result image.

The post-processing part 350 may perform, based on the color difference measured from the result image quality measuring part 340 being greater than or equal to the first threshold value, the weighted-summation of a Y value of the input image and a Y value of the output image, and change the Y value of the input image to a weighted-summed Y value. That is, the post-processing part 350 may output the input image in which the Y value is changed to the weighted-summed Y value, based on the color difference measured from the result image quality measuring part 340 being greater than or equal to the first threshold value, and output the output image, based on the color difference measured from the result image quality measuring part 340 being less than the first threshold value.

Figure 4:
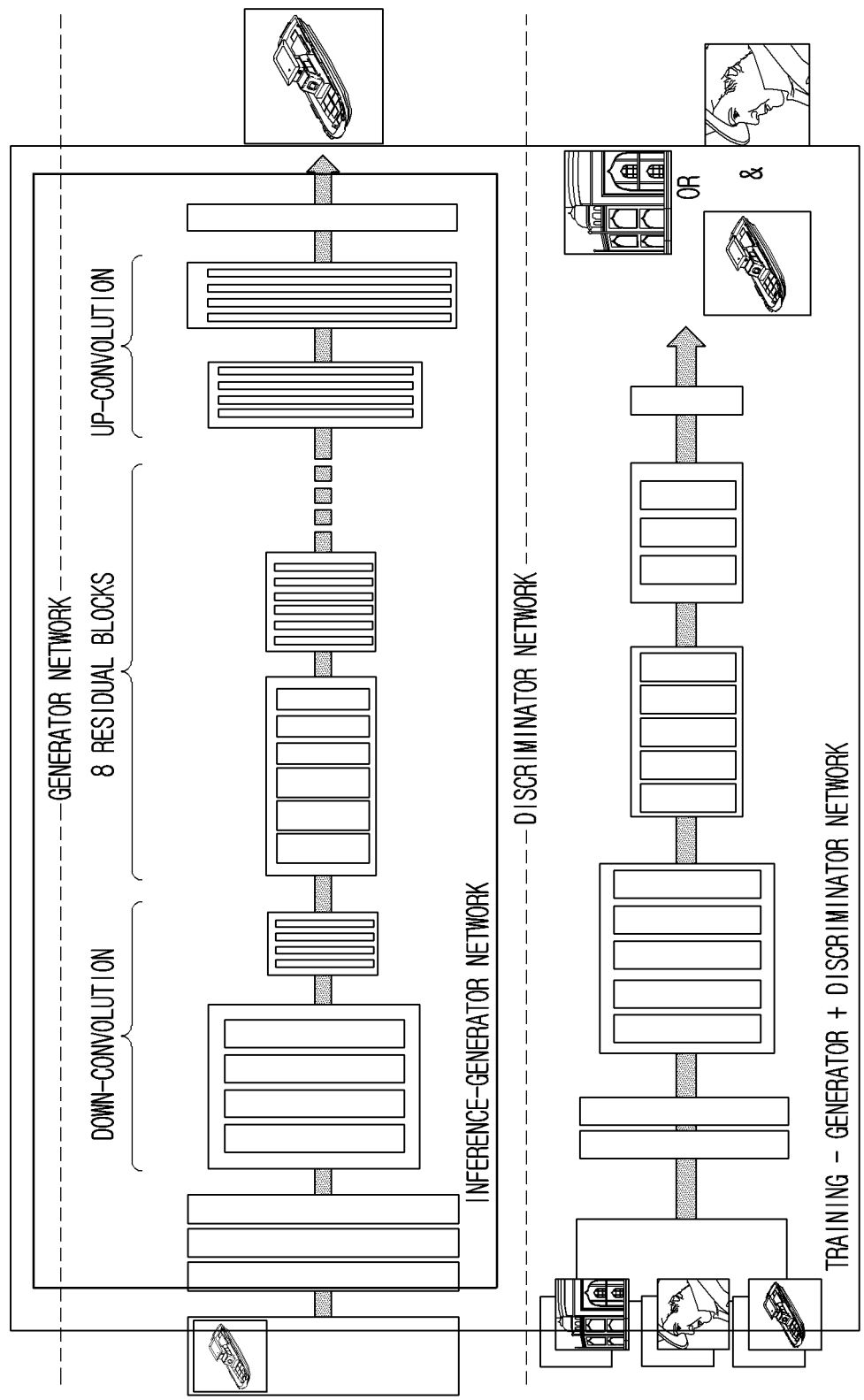
FIG. 4 is a diagram illustrating a first neural network model trained to transfer a style of an image according to an embodiment.

FIG. 4 is a diagram illustrating a first neural network model trained to transfer a style of an image according to an embodiment.

The first neural network model may be a neural network model trained to transfer an image style such as the neural style transfer, the cycle GAN, and the cartoon GAN. However, the embodiment is not limited thereto, and the first neural network model may be any model as long as it can transfer the image style.

As illustrated in FIG. 4, the learning process is configured of the generator network and the discriminator network. When learning is complete, the generator network may operate as the first neural network model.

For example, the cartoon GAN may be configured such that learning is carried out through the generator network training to transfer the actual photograph to a cartoon style, and through the discriminator network training to differentiate the actual photograph and the cartoon, and when learning is complete, the generator network may operate as the first neural network model.

Figure 5:
FIG. 5 is a depiction of an illustrative example of performing a deblur pre-processing according to an embodiment.
Figure 5:
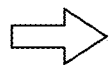
Figure 5:
Figure 5:
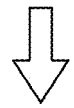
Figure 5:
Figure 5:
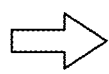
Figure 5:

FIG. 5 is a depiction of an illustrative example of performing a deblur pre-processing according to an embodiment.

In FIG. 5, the upper-left image is an original image, and the upper-right image is the result of a style transfer without pre-processing the original image.

In FIG. 5, the lower-left image is the result of deblur processing the original image, and the lower-right image is the result of a style transfer on the deblur-processed image.

It can be seen that the lower-right image of FIG. 5 is clearer when compared to the upper-right image of FIG. 5.

Figure 6:
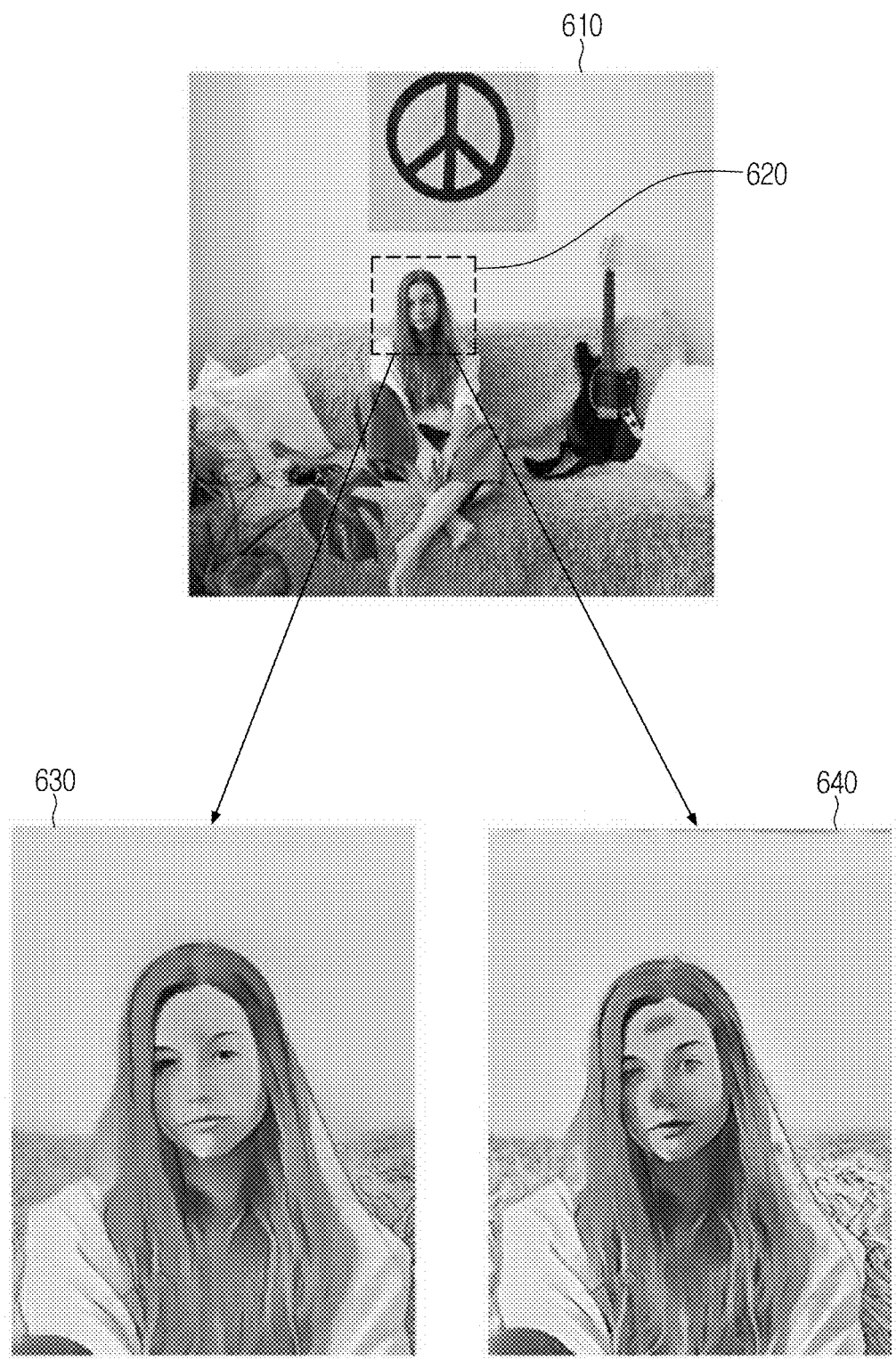
FIG. 6 is a depiction of an illustrative example of performing a scaling pre-processing according to an embodiment.

FIG. 6 is a depiction of an illustrative example of performing a scaling pre-processing according to an embodiment.

The upper image of FIG. 6 is an original image 610, and a facial area 620 of a person in the original image 610 may be a very small area.

The lower-left image 630 of FIG. 6 shows an image of the facial area 620 from the original image 610 after a style transfer without pre-processing, and the lower-right image 640 of FIG. 6 shows the results of up-scaling the facial area 620 of the person, applying the style transfer, and then down-scaling the style-transferred area again.

It can be seen that the lower-left image 630 of FIG. 6 shows details such as eyes, a nose, a mouth, and the like blurred, but the lower-right image 640 shows the eyes, the nose, the mouth, and the like more clearly represented.

Figure 7:
FIG. 7 is a depiction of an illustrative example of performing a contrast pre-processing according to an embodiment.

FIG. 7 is a depiction of an illustrative example of performing a contrast pre-processing according to an embodiment.

The upper image of FIG. 7 is an original image 710 captured such that the contrast is low or dark due to the effect of backlight or ambient illuminance.

The lower-left image 720 of FIG. 7 depicts the results of a style transfer on the original image 710 without pre-processing, and the lower-right image 730 of FIG. 7 depicts the results of a style transfer on the original image 710 after a pre-processing operation of raising the contrast.

Based on comparing an enlargement 725 of an area in the resulting lower-left image 720 of FIG. 7 and an enlargement 735 of an area in the resulting lower-right image 730 of FIG. 7, it can be verified that the latter is clearer.

Figure 8:
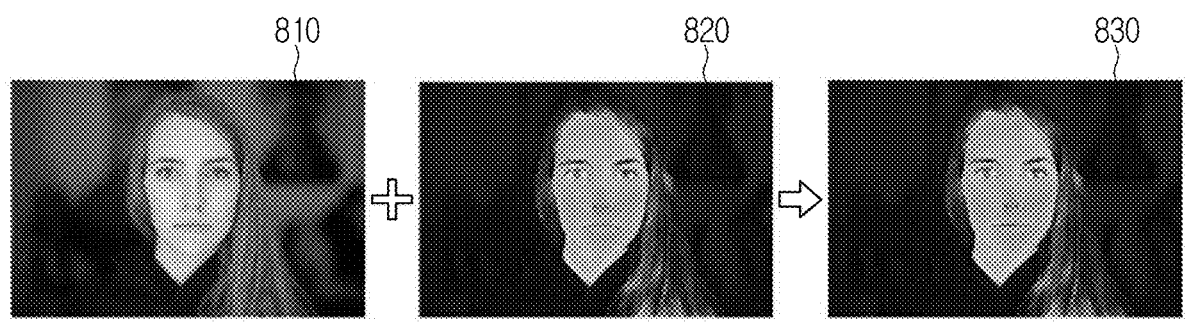
FIG. 8 is a depiction of an illustrative example of performing a post-processing according to an embodiment.

FIG. 8 is a depiction of an illustrative example of performing a post-processing according to an embodiment.

The leftmost image of FIG. 8 is an original image 810, and the middle image of FIG. 8 is the style-transferred image 820. The style-transferred image 820 may be excessively changed in color, and the processor 120 may be configured to perform a weighted-summation of a Y value of the original image 810 and a Y value of the style-transferred image 820, and update the Y value of the original image 810 to the weighted-summed Y value. The rightmost image of FIG. 8 may be a modification of the original image 830 in which the Y value is converted to the weighted-summed Y value, and may represent a result product in which the color difference with the original image 810 is not significant and the style is transferred.

Figure 9:
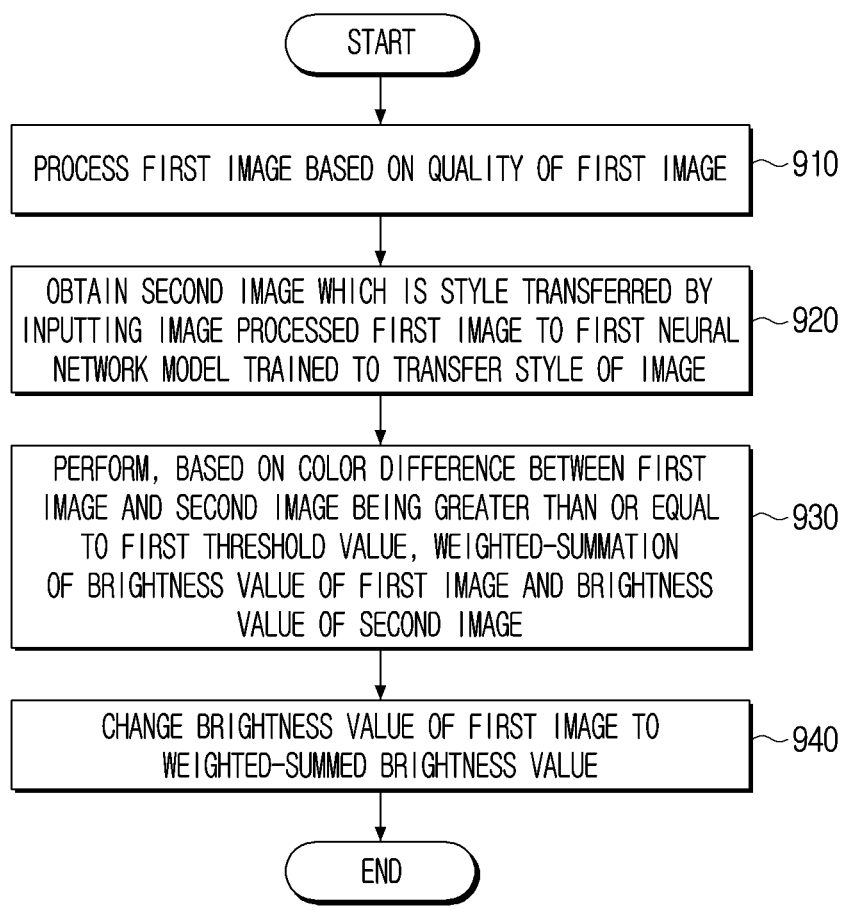
FIG. 9 is a flow diagram illustrating a control method of an electronic apparatus according to an embodiment.

FIG. 9 is a flow diagram illustrating a control method of an electronic apparatus according to an embodiment.

First, a first (original) image is processed based on the quality of the first image (S910). Then, a style-transferred second image may be obtained by inputting the image-processed first image to a first neural network model, which is trained to transfer a style of an image (S920). Then, based on a color difference between the first image and the second image being greater than or equal to the first threshold value, a weighted-summation of the brightness value of the first image and the brightness value of the second image is performed (S930). Then, the brightness value of the first image may be changed to the weighted-summed brightness value (S940).

In certain embodiments, the processing of the first image (S910) may include determining a value for at least one quality of the first image from among the sharpness of the first image, the contrast of the first image, or the size of an object included in the first image, and process the first image based on the determined value of the quality.

In certain embodiments, the processing of the image (S910) may include determining a value of the sharpness of the first image based on the frequency component of the first image, and obtaining a sharpness-enhanced first image by inputting the first image to a second neural network model trained to enhance a sharpness of an image, based on the sharpness of the first image being less than the threshold sharpness.

In certain embodiments, the processing of the image (S910) may include identifying an object from the first image, determining a value of a first sharpness of a first area defined to be of a pre-set size and to include the object, based on the frequency component of the first area, and obtaining a sharpness-enhanced first image by inputting the first image to the second neural network model based on the first sharpness being less than the threshold sharpness.

In certain embodiments, the processing of the image (S910) may include determining a value of a second sharpness of a second area, which is defined to be a remaining area of the first image excluding the first area, based on a frequency component of the second area, and obtaining, based on the first sharpness being greater than the second sharpness by the second threshold value or more and the first sharpness being less than the threshold sharpness, a sharpness-enhanced first area by inputting the first area to the second neural network model.

In certain embodiments, the processing of the image (S910) may include obtaining, based on the contrast of the first image being less than a threshold contrast, a contrast-enhanced first image by inputting the first image to a third neural network model trained to enhance the contrast of the image, or in alternative embodiments obtaining the contrast-enhanced first image through the histogram equalization method.

In certain embodiments, the processing of the image (S910) may include up-scaling the first area of the pre-set size which includes the object based on the size of the object included in the first image being less than a threshold size, and the obtaining of the second image (S920) may include obtaining an up-scaled style-transferred area which is by inputting the up-scaled area to the first neural network model, and then down-scaling the up-scaled style-transferred area.

In certain embodiments, the obtaining of the second image (S920) may include updating the second image based on the down-scaled area.

In certain embodiments, the processing of the image (S910) may include obtaining the up-scaled area by inputting the area of the pre-set size to a fourth neural network model trained to up-scale an image, or in alternative embodiments obtaining the up-scaled area by interpolating the area of the pre-set size.

According to the various embodiments of the disclosure as described above, the electronic apparatus may provide an enhanced style-transfer result product according to having pre-processed the image based on elements which may be problematic in the style transfer process.

In addition, the electronic apparatus may provide a result product in which a degree of color change is maintained to less than or equal to a certain level, even if the style is transferred, according to mixing the original image and the style-transfer result product.

According to an embodiment, the various embodiments described in the above may be implemented with software including instructions stored in a machine-readable storage media (e.g., computer). The machine may call an instruction stored in the storage medium, and as a device capable of operating according to the called instruction, may include an electronic device (e.g., electronic apparatus 100) according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

According to an embodiment, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a storage medium such as a server of a manufacturer, a server of an application store, or a memory of a relay server, or temporarily generated.

In addition, according to an embodiment, the various embodiments described above may be implemented in a recordable medium which is readable by a computer or a device similar to the computer using software, hardware, or the combination of software and hardware. In some cases, embodiments described herein may be implemented by the processor itself. According to a software implementation, embodiments such as the procedures and functions described herein may be implemented with separate software modules. The respective software modules may perform one or more functions and operations described herein.

The computer instructions for performing processing operations of the devices according to the various embodiments described above may be stored in a non-transitory computer-readable medium. The computer instructions stored in this non-transitory computer-readable medium may cause a specific device to perform the processing operations in the device according to the above-described various embodiments when executed by the processor of the specific device. The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

In addition, respective elements (e.g., a module or a program) according to various embodiments described above may be configured as a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by the respective corresponding elements prior to integration. Operations performed by a module, a program, or other element, in accordance with various embodiments, may be executed sequentially, in parallel, repetitively, or in a heuristically manner, or at least some operations may be performed in a different order, omitted, or a different operation may be added.

While embodiments of the disclosure have been illustrated and described, it will be understood that the various embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic apparatus comprising:
a memory configured to store a first neural network model trained to transfer a style of an image; and
a processor configured to:
perform at least one image processing operation on a first image, based on at least one quality of the first image, to obtain an image-processed first image,
obtain a second image having a style transferred thereto by inputting the image-processed first image to the first neural network model,
based on a color difference between the first image and the second image being greater than or equal to a first threshold value:
perform a weighted-summation of a brightness value of the first image and a brightness value of the second image to obtain a weighted-summed brightness value, and
change the brightness value of the first image to the weighted-summed brightness value; and
based on the color difference between the first image and the second image being less than the first threshold value, output the second image.

2. The electronic apparatus of claim 1, wherein the processor is further configured to:
identify a value of at least one quality of the first image from among a sharpness of the first image, a contrast of the first image, or a size of an object included in the first image; and
perform the image processing operation on the first image based on the identified value.

3. The electronic apparatus of claim 2,
wherein the memory is further configured to store a second neural network model trained to enhance a sharpness of an image; and
wherein the processor is further configured to:
identify a value of the sharpness of the first image based on a frequency component of the first image, and
input the first image to the second neural network model, based on the value of the sharpness of the first image being less than a threshold sharpness value, to obtain a sharpness-enhanced first image.

4. The electronic apparatus of claim 2,
wherein the memory is further configured to further store a second neural network model trained to enhance a sharpness of an image; and
wherein the processor is further configured to:
identify a representation of an object within the first image,
identify a value of a first sharpness of a first area based on a frequency component of the first area, the first area defined to be an area of the first image of a pre-set size which includes the representation of the object, and
input the first image to the second neural network model, based on the value of the first sharpness being less than the threshold sharpness value, to thereby obtain a sharpness-enhanced first image.

5. The electronic apparatus of claim 4, wherein the processor is further configured to:
identify a value of a second sharpness of a second area based on a frequency component of the second area which is a remaining area of the first image excluding the first area; and
input the first area to the second neural network model, based on the value of the first sharpness being greater than the value of the second sharpness by at least a second threshold sharpness value and the value of the first sharpness being less than the threshold sharpness value, to obtain a sharpness-enhanced first area.

6. The electronic apparatus of claim 2,
wherein the memory is further configured to store a third neural network model trained to enhance a contrast of an image; and
wherein the processor is further configured to obtain, based on a value of the contrast of the first image being less than a threshold contrast value, a contrast-enhanced first image by inputting the first image to the third neural network model or by using a histogram equalization method.

7. The electronic apparatus of claim 2, wherein the processor is further configured to:
up-scale an area of a pre-set size which includes the object, based on the size of the object included in the first image being less than a threshold size, to obtain an up-scaled area,
input the up-scaled area to the first neural network model to obtain a style-transferred up-scaled area, and
down-scale the style-transferred up-scaled area to obtain a down-scaled area.

8. The electronic apparatus of claim 7, wherein the processor is further configured to update the second image based on the down-scaled area.

9. The electronic apparatus of claim 7, wherein the memory is further configured to store a fourth neural network model trained to up-scale an image, and
wherein the processor is further configured to up-scale the area by inputting the area to the fourth neural network model, or by interpolating the area.

10. The electronic apparatus of claim 7, wherein the processor is further configured to:
identify, based on a plurality of objects being identified in the first image, one object from among the plurality of objects based on a type of the plurality of objects; and
up-scale, based on a size of the identified object being less than the threshold size, the area of the pre-set size which includes the identified object.

11. The electronic apparatus of claim 1, wherein the processor is further configured to:
convert the first image and the second image to YUV color coordinates; and
identify the color difference between the first image and the second image by comparing the first image converted to the YUV color coordinates and the second image converted to the YUV color coordinates.

12. A control method of an electronic apparatus, the method comprising:
processing a first image based on a quality of the first image to obtain an image-processed first image;
obtaining a second image having a style transferred thereto by inputting the image-processed first image to a first neural network model trained to transfer a style of an image;

based on a color difference between the first image and the second image being greater than or equal to a first threshold value:
   performing a weighted-summation of a brightness value of the first image and a brightness value of the second image to obtain a weighted-summed brightness value, and
   changing the brightness value of the first image to the weighted-summed brightness value; and
based on the color difference between the first image and the second image being less than the first threshold value, outputting the second image.

13. The method of claim 12, wherein the processing of the first image comprises:
   identifying a value of at least one quality of the first image from among a sharpness of the first image, a contrast of the first image, or a size of an object included in the first image; and
   processing the first image based on the identified value.

14. The method of claim 13, wherein the processing of the first image further comprises:
   identifying a value of the sharpness of the first image based on a frequency component of the first image; and
   obtaining, based on the value of the sharpness of the first image being less than a threshold sharpness value, a sharpness-enhanced first image by inputting the first image to a second neural network model trained to enhance a sharpness of an image.

15. The method of claim 14, wherein the processing of the first image further comprises:
   identifying a representation of an object in the first image;
   identifying a value of a first sharpness of a first area based on a frequency component of the first area, the first area being an area of the first image of a pre-set size which includes the object; and
   obtaining, based on the value of the first sharpness being less than the threshold sharpness value, a sharpness-enhanced first image by inputting the first image to a second neural network model trained to enhance a sharpness of an image.

16. The electronic apparatus of claim 15, wherein the processing of the first image further comprises:
   identifying a value of a second sharpness of a second area based on a frequency component of the second area which is a remaining area of the first image excluding the first area; and
   inputting the first area to the second neural network model, based on the value of the first sharpness being greater than the value of the second sharpness by at least a second threshold sharpness value and the value of the first sharpness being less than the threshold sharpness value, to obtain a sharpness-enhanced first area.

17. The electronic apparatus of claim 13, wherein the processing of the first image further comprises, based on a value of the contrast of the first image being less than a threshold contrast value, obtaining a contrast-enhanced first image by inputting the first image to a third neural network model trained to enhance a contrast of an image or by using a histogram equalization method.

18. The electronic apparatus of claim 13,
   wherein the processing of the first image further comprises up-scaling an area of a pre-set size which includes the object, based on the size of the object included in the first image being less than a threshold size, to obtain an up-scaled area; and
   wherein the obtaining of the second image comprises:
      inputting the up-scaled area to the first neural network model to obtain a style-transferred up-scaled area, and
      down-scaling the style-transferred up-scaled area to obtain a down-scaled area.

19. The electronic apparatus of claim 18, wherein the obtaining of the second image comprises updating the second image based on the down-scaled area.

20. The electronic apparatus of claim 18, wherein the processing of the first image further comprises up-scaling the area by inputting the area to a fourth neural network model trained to up-scale an image, or by interpolating the area.

* * * * *